United States Patent
Levine et al.

(10) Patent No.: US 8,271,057 B2
(45) Date of Patent: Sep. 18, 2012

(54) CONDITION-BASED ACTIVATION, SHUT-DOWN AND MANAGEMENT OF APPLICATIONS OF MOBILE DEVICES

(75) Inventors: Uri Levine, Kfar Saba (IL); Amir Shinar, Moshav Ein-Vered (IL); Ehud Shabtai, Tel Aviv (IL); Yuval Shmuelevitz, Ramat Hasharon (IL)

(73) Assignee: Waze Mobile Ltd., Ra'Anana (IL)

( * ) Notice: Subject to any disclaimer, the term of this patent is extended or adjusted under 35 U.S.C. 154(b) by 733 days.

(21) Appl. No.: 12/382,411

(22) Filed: Mar. 16, 2009

(65) Prior Publication Data

US 2010/0231383 A1 Sep. 16, 2010

(51) Int. Cl.
*H04B 1/38* (2006.01)

(52) U.S. Cl. ..................... 455/574; 340/693.3

(58) Field of Classification Search ............... 340/693.1, 340/693.3, 539.13, 7.32; 455/127.5, 404.2, 455/456.1, 343.1, 574

See application file for complete search history.

(56) References Cited

U.S. PATENT DOCUMENTS

| | | | |
|---|---|---|---|
| 5,428,544 A | 6/1995 | Shyu | |
| 5,845,228 A | 12/1998 | Uekawa et al. | |
| 6,047,234 A | 4/2000 | Cherveny et al. | |
| 6,111,539 A | 8/2000 | Mannings et al. | |
| 6,150,961 A | 11/2000 | Alewine et al. | |
| 6,208,935 B1 | 3/2001 | Yamada et al. | |
| 6,385,539 B1 | 5/2002 | Wilson et al. | |
| 6,405,130 B1 | 6/2002 | Piwowarski | |
| 6,459,986 B1 | 10/2002 | Boyce et al. | |
| 6,490,519 B1 | 12/2002 | Lapidot et al. | |
| 6,804,524 B1 | 10/2004 | Vandermeijden | |
| 6,862,502 B2 | 3/2005 | Peltz et al. | |
| 6,992,598 B2 | 1/2006 | Poltorak | |
| 7,080,019 B1 | 7/2006 | Hurzeler | |
| 7,253,747 B2 | 8/2007 | Noguchi | |
| 7,359,713 B1 | 4/2008 | Tiwari | |
| 7,469,827 B2 | 12/2008 | Katragadda et al. | |
| 7,474,232 B2 | 1/2009 | Chen et al. | |
| 7,516,010 B1 | 4/2009 | Kaplan et al. | |
| 7,538,690 B1 | 5/2009 | Kaplan et al. | |
| 7,642,928 B2 | 1/2010 | Hutchison | |
| 7,805,239 B2 | 9/2010 | Kaplan et al. | |
| 2003/0100993 A1 | 5/2003 | Kirshenbaum et al. | |
| 2003/0154480 A1 | 8/2003 | Goldthwaite et al. | |

(Continued)

FOREIGN PATENT DOCUMENTS

EP 1742191 10/2007

(Continued)

OTHER PUBLICATIONS

International Search Report for PCT/IB2010/050726 dated Jun. 29, 2010.

(Continued)

*Primary Examiner* — Thomas Mullen (74) *Attorney, Agent, or Firm* — Haverstock & Owens LLP (57) ABSTRACT

Device, system, and method of condition-based activation, shut-down and management of applications of mobile devices. For example, a method includes: based on one or more collected information items, determining whether or not a condition related to a mobile device is true; and based on the determination, controlling a monitored application of the mobile device by performing at least one of: activating the monitored application; shutting down the monitored application; activating a feature of the monitored application; deactivating a feature of the monitored application; and switching the monitored application from a first mode of operation to a second, different, mode of operation.

24 Claims, 2 Drawing Sheets

U.S. PATENT DOCUMENTS

| | | |
|---|---|---|
| 2004/0049424 A1 | 3/2004 | Murray et al. |
| 2004/0059503 A1 | 3/2004 | Peters |
| 2004/0107048 A1 | 6/2004 | Yokota |
| 2004/0158392 A1 | 8/2004 | Choi |
| 2004/0172192 A1 | 9/2004 | Knutson |
| 2004/0249568 A1 | 12/2004 | Endo et al. |
| 2005/0071080 A1 | 3/2005 | Sano |
| 2005/0083211 A1 | 4/2005 | Shafir et al. |
| 2005/0113124 A1 | 5/2005 | Syjarinne et al. |
| 2005/0216301 A1 | 9/2005 | Brown |
| 2005/0253753 A1 | 11/2005 | Lalik et al. |
| 2005/0280555 A1 | 12/2005 | Warner |
| 2006/0015249 A1 | 1/2006 | Gieseke |
| 2006/0155427 A1 | 7/2006 | Yang |
| 2006/0161341 A1 | 7/2006 | Haegegarth et al. |
| 2006/0176847 A1 | 8/2006 | Chen et al. |
| 2006/0253249 A1 | 11/2006 | Bruelle-Drews |
| 2006/0287818 A1 | 12/2006 | Okude et al. |
| 2007/0010941 A1 | 1/2007 | Marsh |
| 2007/0024467 A1 | 2/2007 | Fujii |
| 2007/0069923 A1 | 3/2007 | Mendelson |
| 2007/0118273 A1 | 5/2007 | Tang et al. |
| 2007/0129885 A1 | 6/2007 | Wellmann |
| 2007/0159354 A1 | 7/2007 | Rosenberg |
| 2007/0271029 A1 | 11/2007 | Tzamaloukas |
| 2007/0276595 A1 | 11/2007 | Lewinson et al. |
| 2007/0293958 A1 | 12/2007 | Stehle |
| 2007/0299599 A1 | 12/2007 | Letchner et al. |
| 2008/0012726 A1 | 1/2008 | Publicover |
| 2008/0014908 A1 | 1/2008 | Vasant |
| 2008/0040031 A1 | 2/2008 | Tu |
| 2008/0046173 A1 | 2/2008 | Lappe et al. |
| 2008/0052545 A1 | 2/2008 | Finkelstein et al. |
| 2008/0077309 A1 | 3/2008 | Cobbold |
| 2008/0088479 A1 | 4/2008 | Caminiti et al. |
| 2008/0091342 A1 | 4/2008 | Assael |
| 2008/0140305 A1 | 6/2008 | Kim et al. |
| 2008/0195428 A1 | 8/2008 | O'Sullivan |
| 2008/0293407 A1 | 11/2008 | Cormier et al. |
| 2009/0070031 A1 | 3/2009 | Ginsberg |
| 2009/0221302 A1 | 9/2009 | Luiro et al. |
| 2009/0234573 A1 | 9/2009 | Notarantonio |
| 2009/0248587 A1 | 10/2009 | Van Buskirk |
| 2010/0042318 A1 | 2/2010 | Kaplan et al. |
| 2010/0057336 A1 | 3/2010 | Levine et al. |
| 2010/0214126 A1 | 8/2010 | Publicover |

FOREIGN PATENT DOCUMENTS

| | | |
|---|---|---|
| JP | 2000298793 | 10/2000 |
| JP | 2003281684 | 3/2003 |

OTHER PUBLICATIONS

International Search Report for PCT Application No. PCT/IB2009/051857 dated Oct. 28, 2009.

International Search Report for PCT Application No. PCT/IB2009/053179 dated Dec. 8, 2009.

International Search Report for PCT Application No. PCT/IB2009/053129 dated Feb. 3, 2010.

Kanoh, H., "Dynamic Route Planning for Car Navigation Systems Using Virus Generic Algorithms," International Journal of Knowledge-Based Intelligent Engineering Systems, pp. 65-78, Jan. 2007.

International Search Report for PCT Application No. PCT/IB2010/050726 dated Jun. 29, 2010.

International Search Report for PCT Application No. PCT/IB2010/051752 dated Sep. 8, 2010.

International Search Report for PCT Application No. PCT/IB2010/054527 dated Jun. 28, 2011.

CONDITION-BASED ACTIVATION, SHUT-DOWN AND MANAGEMENT OF APPLICATIONS OF MOBILE DEVICES

FIELD

Some embodiments are related to the field of mobile computerized devices.

BACKGROUND

Mobile computerized devices may be used for a variety of tasks, for example, to send and receive text messages, to send and receive files, to browse the World Wide Web, to play games, or the like. Some portable devices may provide the user with Location-Based Services (LBS), for example, a mapping application, a road navigation application, or the like. For example, a portable navigation device may include a Global Positioning System (GPS) receiver, which may be used for determining the location or the portable device, and to provide the user with information that is particularly relevant to that location.

Most portable devices are subject to a limiting form factor, which requires the portable device to have relatively small dimensions and a relatively low weight, in order to maintain their portability and mobility features. Accordingly, the portable device may include an internal power source, such as a rechargeable battery, which may provide power to the portable device for a limited and relatively short period of time. The portable device may further include various software components and/or hardware components which may be power-consuming or resource-consuming, for example, a color screen, a camera, a wireless transceiver, or the like. The continuous operation of such components may result in continuous consumption of power and/or other resources, which may be limited in a portable device.

SUMMARY

Some embodiments include, for example, devices, systems, and methods of power saving for mobile devices, as well as condition-based activation, shut-down and/or management of applications of mobile devices.

In some embodiments, for example, a method includes: based on one or more collected information items, determining whether or not a condition related to a mobile device is true; and based on the determination, controlling a monitored application of the mobile device by performing at least one of: activating the monitored application; shutting down the monitored application; activating a feature of the monitored application; deactivating a feature of the monitored application; and switching the monitored application from a first mode of operation to a second, different, mode of operation.

In some embodiments, for example, the one or more information items include at least one of: Cell ID information; connectivity information to a wireless communication network; roaming information; time-related information; date-related information; accelerometer information; and Global Positioning System (GPS) data.

In some embodiments, for example, the switching includes: switching a Global Positioning System (GPS) receiver of the mobile device into a mode selected from the group consisting of: operational mode, standby mode, and shut-down mode.

In some embodiments, for example, the method includes: if the mobile device is not in rapid motion, turning off a navigation application of the mobile device.

In some embodiments, for example, the method includes: if the mobile device is roaming, disconnecting a wireless data link of the mobile device.

In some embodiments, for example, the method includes: determining whether or not the mobile device is in rapid motion; and if the mobile device is in rapid motion, activating the monitored application.

In some embodiments, for example, determining whether or not the mobile device is in rapid motion includes: comparing among two or more consecutive measures of data items indicating location of the mobile device.

In some embodiments, for example, the method includes: determining whether or not the mobile device is in rapid motion; and if the mobile device is not in rapid motion, and if a remaining power level of the mobile device is below a threshold value, switching the monitored application into a reduced-power mode of operation.

In some embodiments, for example, the method includes: based on a plurality of Global Positioning System (GPS) readings, determining that the mobile device is not in motion; presenting a notification that the monitored application is to be automatically shut-down unless a user of the mobile device selects to avoid shut-down of the monitored application; and if the user of the mobile device does not select, within a pre-defined time period, to avoid shut-down of the monitored application, then shutting down the monitored application.

In some embodiments, for example, the mobile device includes a device selected from the group consisting of: a cellular phone, a Personal Digital Assistant (PDA) device, a smart-phone, a Portable Navigation Device (PND), a mobile route guidance device, a mobile mapping device, a mobile traffic updates device, a portable audio player, a portable video player, and a portable audio/video player.

In some embodiments, for example, the monitored application includes a Location-Based Service (LBS) application.

In some embodiments, for example, the monitored application includes an application selected from the group consisting of: a route-guidance application; a dynamic route-guidance application; a navigation application; a mapping application; a traffic updates application; an application having a relatively high power consumption; a processing-intensive application; an application having a relatively high consumption of resources of the mobile devices; an application which automatically refreshes data using a remote server; and an application which periodically refreshes data using a remote server.

In some embodiments, for example, a mobile device includes: a monitoring module to determine, based on one or more collected information items, whether or not a condition related to the mobile device is true; and based on the determination, to control a monitored application of the mobile device by performing at least one of: activating the monitored application; shutting down the monitored application; activating a feature of the monitored application; deactivating a feature of the monitored application; and switching the monitored application from a first mode of operation to a second, different, mode of operation.

In some embodiments, for example, the one or more information items include at least one of: Cell ID information; connectivity information to a wireless communication network; roaming information; time-related information; date-related information; accelerometer information; and Global Positioning System (GPS) data.

In some embodiments, for example, the monitoring module is to switch a Global Positioning System (GPS) receiver of the mobile device into a mode selected from the group consisting of: operational mode, standby mode, and shut-down mode.

In some embodiments, for example, if the mobile device is not in rapid motion, the monitoring module is to turn off a navigation application of the mobile device.

In some embodiments, for example, if the mobile device is roaming, the monitoring module is to disconnect a wireless data link of the mobile device.

In some embodiments, for example, the monitoring module is to determine whether or not the mobile device is in rapid motion; and if the mobile device is in rapid motion, to activate the monitored application.

In some embodiments, for example, the monitoring module is to determine whether or not the mobile device is in rapid motion by comparing among two or more consecutive measures of data items indicating location of the mobile device.

In some embodiments, for example, the monitoring module is to determine whether or not the mobile device is in rapid motion; and if the mobile device is not in rapid motion, and if a remaining power level of the mobile device is below a threshold value, then the monitoring module is to switch the monitored application into a reduced-power mode of operation.

In some embodiments, for example, the monitoring module is to determine, based on a plurality of Global Positioning System (GPS) readings, that the mobile device is not in motion; to present a notification that the monitored application is to be automatically shut-down unless a user of the mobile device selects to avoid shut-down of the monitored application; and if the user of the mobile device does not select, within a pre-defined time period, to avoid shut-down of the monitored application, to shut-down the monitored application.

In some embodiments, for example, the mobile device includes a device selected from the group consisting of: a cellular phone, a Personal Digital Assistant (PDA) device, a smart-phone, a Portable Navigation Device (PND), a mobile route guidance device, a mobile mapping device, a mobile traffic updates device, a portable audio player, a portable video player, and a portable audio/video player.

In some embodiments, for example, the monitored application includes a Location-Based Service (LBS) application.

In some embodiments, for example, the monitored application includes an application selected from the group consisting of: a route-guidance application; a dynamic route-guidance application; a navigation application; a mapping application; a traffic updates application; an application having a relatively high power consumption; a processing-intensive application; an application having a relatively high consumption of resources of the mobile devices; an application which automatically refreshes data using a remote server; and an application which periodically refreshes data using a remote server.

Some embodiments may include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a Personal Navigation Device (PND), a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo™), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3GPP Long Term Evolution (LTE), 3.5G, or the like. Some embodiments may be used in conjunction with various other devices, systems and/or networks.

The terms "wireless device" or "mobile device" as used herein include, for example, a device capable of wireless communication, a communication device or communication station capable of wireless communication, a mobile phone, a cellular phone, a PDA capable of wireless communication, a handheld device capable of wireless communication, a portable or non-portable device capable of wireless communication, or the like.

The terms "web" or "Web" as used herein includes, for example, the World Wide Web; a global communication system of interlinked and/or hypertext documents, files, websites and/or web-pages accessible through the Internet or through a global communication network; including text, images, videos, multimedia components, hyperlinks, or other content.

The term "user" as used herein includes, for example, a person or entity that owns a computing device or a wireless device; a person or entity that operates or utilizes a computing device or a wireless device; or a person or entity that is otherwise associated with a computing device or a wireless device.

As an overview, some embodiments include devices, systems, and methods of power saving for mobile devices, as well as condition-based activation, shut-down and/or management of applications of mobile devices. For example, a mobile device includes a monitored application (e.g., an LBS application, or an application which heavily consumes resources) associated with a monitoring module. The monitoring module may obtain or receive information from various sources (e.g., accelerometer, Cell-ID, GPS data, wireless links connectivity, usage patterns, or the like), and may estimate whether or not the mobile device is in motion; and more particularly, whether or not the mobile device is within a moving vehicle or a rapidly-moving vehicle.

If it is estimated that the mobile device is not in motion, or is in relatively slow motion (e.g., used by a walking user or even by a running user), then the monitoring module may perform one or more operations targeted at reducing the power consumption or other resource consumption (e.g., processing) of the monitored application. For example, if the power level of the mobile device is below a particular threshold, the monitoring module may switch the monitored application into a reduced power mode, or may shut down the monitored application (e.g., subject to notifying the user and/or receiving the user's confirmation). Subsequently, if it is estimated that the mobile device is in motion, or is in relatively rapid motion (e.g., used within a moving vehicle), then the monitoring module may switch the monitored application into full-power mode, or may activate functions (e.g., GPS receiver) that were previously deactivated or in "standby" mode, or may activate or turn-on the monitored application if one or more conditions indicate that such activation or turning-on may be beneficial or required.

Figure 1:
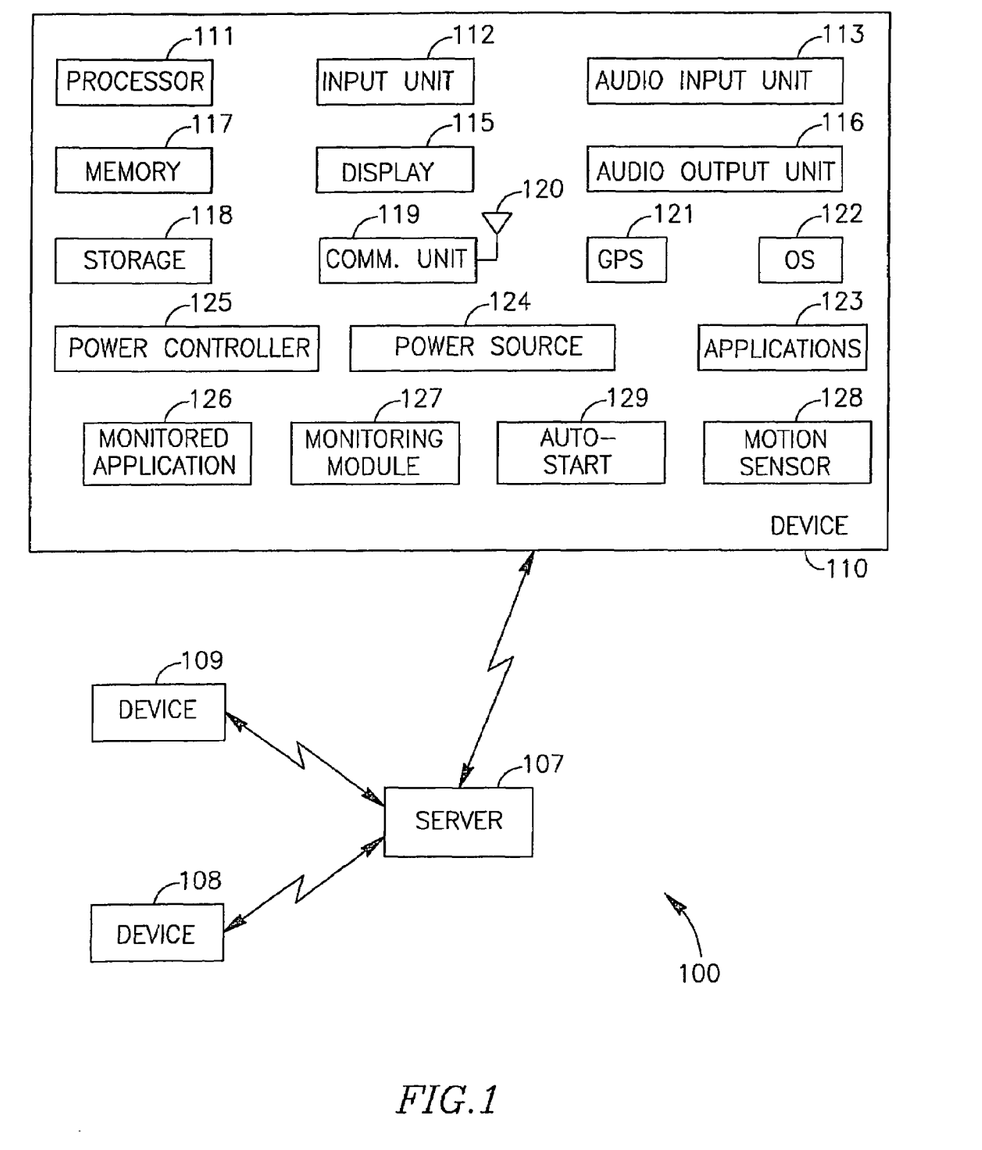
FIG. 1 is a schematic block diagram illustration of a system in accordance with some demonstrative embodiments.

FIG. 1 schematically illustrates a block diagram of a system 100 in accordance with some demonstrative embodiments. System 100 includes a mobile device 110, which may be implemented, for example, as a portable device, a handheld device, a Portable Navigation Device (PND), a cellular phone, a "smartphone" device, a Personal Digital Assistant (PDA) device, an on-board or off-board device, a hybrid device (e.g., combining features of a PDA and a cellular phone), a wireless communication device, or the like. In some embodiments, device 110 may optionally be, or may include functions of, a portable audio player, a portable video player, a portable audio/video player, a portable media player, a portable device having a touch-screen, a relatively small computing device, a non-desktop computer or computing device, a portable device, a "Carry Small Live Large" (CSLL) device, an Ultra Mobile Device (UMD), an Ultra Mobile PC (UMPC), a Mobile Internet Device (MID), a Consumer Electronic (CE) device, an "Origami" device or computing device, a device that supports Dynamically Composable Computing (DCC), a context-aware device, or the like.

System 100 may optionally include other mobile devices, for example, devices 108 and 109. Some or all of mobile devices 108-110 may be able to communicate among themselves, and/or may be able to communicate with a server 107 (e.g., a route guidance server, a real-time server, a traffic server, a traffic prediction server), using one or more wireless communication links. Communication may be performed, for example, over a shared access medium, an a-synchronic or asynchronous wireless network, a synchronic wireless network, a managed wireless network, a non-managed wireless network, a burstable wireless network, a non-burstable wireless network, a scheduled wireless network, a non-scheduled wireless network, a combination of networks or links, or the like. Communication may be performed using one or more suitable protocols, for example, Transmission Control Protocol (TCP), User Datagram Protocol (UDP), Hypertext Transfer Protocol (HTTP), Wireless Application Protocol (WAP), or other suitable protocol(s). The communication may include, for example, transmissions by devices 108-110 to server 107 of their location and/or velocity; transmissions by server 107 to devices 108-110 indicating traffic updates, traffic predictions, dynamic route guidance; or the like.

Mobile device 110 may be implemented using suitable hardware components and/or software components, for example, a processor 111, an input unit 112, an audio input unit 113, a display unit 115, an audio output unit 116, a memory unit 117, a storage unit 118, a communication unit 119, and/or other suitable components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 122 or of one or more applications 123.

Input unit 112 includes, for example, a keyboard, a keypad, a mouse, a touch-pad, a touch-screen, a joystick, a track-ball, a stylus, or other suitable pointing unit or input device.

Audio input unit 113 may include, for example, a microphone or a line-in socket able to receive audio input from the user of device 110. The received audio may include speech commands, which may trigger voice-activated or voice-operated actions to be performed by device 110. For example, the audio input unit may be used to receive from a user a speech indication of a destination (e.g., an address of a destination), and this audio input may be used by a navigation application in order to assist the user in navigating to that destination.

Display unit 115 may include, for example, a Liquid Crystal Display (LCD) display unit, a plasma display unit, or other suitable types of displays or screens. In some embodiments, display unit 115 may include a touch-screen, such that display unit 115 may be able to present output as well as to receive touch-based input or multi-touch input.

Audio output unit 116 may include, for example, one or more speakers or earphones or line-out sockets able to produce audio output. In some embodiments, for example, output generated by device 110 may be presented visually on the display unit 115, and/or may be presented audibly as audio output using the audio output unit 116.

Memory unit 117 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 118 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 117 and/or storage unit 118 may, for example, store data processed by device 110.

Communication unit 119 includes, for example, a wired or wireless transceiver, a wired or wireless modem, a wired or wireless Network Interface Card (NIC) or adapter, or other unit suitable for transmitting and/or receiving communication signals, blocks, frames, transmission streams, packets, messages and/or data. In some embodiments, for example, communication unit 119 may include a wireless Radio Frequency (RF) transceiver able to transmit and/or receive wireless RF signals, e.g., through one or more antennas 120 or sets of antennas. For example, such transceiver may be implemented using a transmitter, a receiver, a transmitter-receiver, or one or more units able to perform separate or integrated functions of transmitting and/or receiving wireless communication signals, blocks, frames, transmission streams, packets, messages and/or data.

Antenna 120 may include an internal and/or external antenna, for example, a RF antenna, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

Device 110 may optionally include a GPS receiver 121, able to receive signal(s) from one or more satellites (or other signal sources) and to determine the spatial location of device 110, for example, based on trilateration or other suitable method.

Device 110 further includes a power source 124, for example, a power-cell or battery, a rechargeable power-cell or battery, one or more electro-chemical cells, a lithium ion (Li-ion) battery, a Li-ion polymer battery, a nickel cadmium (NiCd) battery, a nickel metal hydride (NIMH) battery, a nickel hydrogen (NIH2) battery, or the like.

Power source 124 may be associated with a power controller 125, which may be able to control, regulate and/or modify the power (e.g., the voltage and/or the current) supplied by the power source 124 to other components of device 110 (e.g., to processor 111, to display unit 115, or the like).

In some embodiments, some or all of the components of device 110 are enclosed in a common housing or packaging, and are interconnected or operably associated using one or more wired or wireless links.

Device 110 may further include a monitored application 126. In some embodiments, the monitored application 126 may be a Location-Based Service (LBS) application, for example, a navigation application, a route guidance application, a mapping application, or other suitable application which provides to the user of device 110 information or services that are dependent, in whole or in part, on the spatial location of device 110. In other embodiments, the monitored application 126 may be a non-LBS application, for example, a resource consuming application, a power consuming application, a processor-intensive application, an applications that heavily utilizes one or more resources (e.g., processing resources, wireless communication resources, power resources, memory resources, network resources), an application that may be needed to be monitored for possible excess usage of resources, an application for which it may be beneficial to suggest to the user to shut-down or temporarily deactivate the application due to its power consumption or other excess usage of resources, an applications utilizing Bluetooth or various network resources, an Internet or Web application (e.g., particularly an application which automatically refreshes or periodically refreshes or dynamically modifies its content), or the like.

The monitored application 126 may be associated with a monitoring module 127 able to monitor, control, regulate and/or modify, the operation of the monitored application 126, or the operational status or operational mode of the monitored application 126 (e.g., fully activated, partially activated, activated and online, activated but offline, in standby mode, deactivated, or the like). The monitoring module 127 may directly or indirectly affect the operation of the monitored application 126, for example, by generating and transferring to the monitored application 126 a command to modify its operational status; by generating and transferring to the power controller 125 a command to modify the power which the power source 124 provides to the monitored application 126 or to another component of device 110 (e.g., processor 111), or the like.

The monitoring module 127 may be implemented, for example, using one or more software and/or hardware components which may be separate from the monitored application 126; as part or component of the monitored application 126; as an add-on or plug-in or extension to the monitored application 126; as a stand-alone application; as part of the OS 122; as part of a driver associated with the monitored application 126 or associated with another component of device 110 (e.g., communication unit 119); as a module embedded within the monitored application; or the like. In some embodiments, the monitoring module 127 may be automatically installed together with the installation of the monitored application 126, or upon the first launching or activation of the monitored application 126.

In some embodiments, the monitoring module 127 may run in the background substantially continuously; or may automatically run and/or operate, for example, periodically at pre-defined time intervals or at user-configurable time intervals (e.g., every minute, every four minutes, or the like).

The monitoring module 127 may periodically check the power level of power source 124, and may perform one or more operations in response to determining that the power level of power source 124 is below a pre-defined threshold. For example, if the power level of power source 124 is below 25 percent of its full capacity, the monitoring module 127 may command the monitored application to reduce power consumption, or to operate in a power-saving mode, to commence power saving, or to further decrease an already-reduced power consumption (e.g., to reduce processing efforts, to reduce wireless communications, or the like).

In some embodiments, more than one threshold values of power levels may be used; for example, a first reduction of power consumption may be commanded by the monitoring module 127 and may be performed by the monitored application 126 when a first threshold value is reached (e.g., power level is below 40 percent of full capacity); and subsequently, a second reduction of power consumption may be commanded by the monitoring module 127 and may be performed by the monitored application 126 when a second threshold value is reached (e.g., power level is below 15 percent of full capacity).

In some embodiments, the user of device 110 may be warned of a possible shut-down or closure of the monitored application 126; optionally, the user of device 110 may be prompted to actively confirm, within a pre-defined period of time (e.g., 30 seconds), that the user wishes to maintain the monitored application 126 running at the current power consumption mode; and if the user does not confirm in due time, the monitored application 126 may modify its operational mode or may shut-down. In some embodiments, the user of device 110 may be warned, notified, or prompted using one or more methods, for example, a textual notification, a graphical notification, an audio notification, an audio-visual notification, a vibrating effect, a ringtone effect, a warning sound, or the like.

In some embodiments, device 110 may optionally include a motion sensor 128, for example, a gyro-movement sensor or accelerometer, able to sense that device 110 is in motion and/or is being accelerated or decelerated. Monitoring module 127 may periodically query the motion sensor 128, directly or through Application Programming Interface (API) or driver associated with the motion sensor 128. If it is determined that device 110 is not in motion, then monitoring module 127 may command the monitored application 126 to reduce its power consumption. Optionally, if device 110 is not in motion, then the time interval for re-checking mobility of device 110 may be modified, for example, increased or doubled.

In some embodiments, monitoring module 127 may obtain from device 110 and/or from OS 122, information about additional applications and/or functionalities which may be actively used, and (optionally) may not be disturbed or interrupted by a modification of the power consumption by the monitored application 126. For example, an active phone call being performed, or a game being played, or a texting application being used, may not be shut down or paused by the operations of monitoring module 127 which are aimed at reducing the power consumption of the monitored application 126.

In some embodiments, upon commencement of the monitoring process by the monitoring module 127, the current Cell-ID information may be obtained by the monitoring module 127 from device 110. The Cell-ID information may include any relevant information which may be provided via the mobile interface, for example, Cell-ID data, MSC ID, signal strength level, or the like. Changes in the Cell-ID information over time may be used by the monitoring module 127 to determine that device 110 is in motion, and to determine accordingly whether or not to reduce power consumption of the monitored application 126.

The monitoring module 127 may further identify connectivity of vehicular devices or car-related devices or accessories, for example, a hands-free Bluetooth kit, a 12 Volts power supply charger, dual-SIM phone activation, or the like.

The monitoring module 127 may further monitor connection to and/or disconnection from one or more wireless communication networks (e.g., IEEE 802.11 "Wi-Fi", or IEEE 802.16 "Wi-Max"). Upon such connection or disconnection, or upon a connectivity modification, the monitoring module 127 may activate the GPS receiver 121 in order to determine, or to verify, that device 110 is indeed in motion. Upon such determination, the monitoring module 127 may modify the operational status of the monitored application 126 and/or the power consumption by the monitored application 126; for example, an LBS monitored application 126 may be activated or fully activated upon detection of motion of device 110.

In some embodiments, monitoring module 127 may collect data from two or more sources in order to determine whether or not device 110 is in motion, and in order to determine whether or not it may be required or beneficial to reduce the power consumption of the monitored application. In some embodiments, two or three or more consecutive measurements (e.g., of location information) may be collected by the monitoring module 127 from one or more sources; the measurements may be compared, and detection of differences (e.g., any difference, or a difference greater than a threshold value) may result in activation of the GPS receiver 121, or modification of the power consumption by the monitored application. In some embodiments, the comparison process may be configured and fine-tuned in order to reduce unnecessary power consumption, and/or in order to reduce unnecessary activation of power-consuming components of device 110 or unnecessary activation (or full activation) of the monitored application 126.

In some embodiments, once the GPS receiver 121 is operational, the monitoring module 127 may analyze the GPS data in order to determine motion, velocity and direction, and in order to confirm or reject the possibility that device 110 is in motion, or more particularly, in motion possibly due to being inside a driving vehicle (namely, high-velocity movement, in contrast with walking velocity or even running velocity). If the GPS receiver 121 is operational but is not able to generate GPS data (e.g., device 110 is inside a covered parking lot), the monitoring module 127 may shut-down the GPS receiver 121 after a pre-defined time period (e.g., three minutes).

Once a high-velocity movement is detected, the monitoring module 127 may trigger an interactive question to the user of device 110 (optionally with an audio/visual alert in order to capture the user's attention), asking the user whether he would like to fully activate the monitored application 126 in order to receive its full functionality, or in order to receive its function which was previously turned-off entirely or partially for power consumption reasons. Based on the user's input, the monitoring module 127 may either fully activate the monitored application, or may deactivate the movement detection process for a (configurable) prolonged time period (e.g., one hour).

Once the monitored application 126 is fully activated, the monitoring module 127 may check that the monitored application is indeed running; and may then check GPS data in order to possibly determine immobility of device 110 for a prolonged period of time (e.g., three minutes or more). If such immobility is detected, the user of device 110 may be prompted whether or not to shut-down the monitored application 126; or, whether or not to switch the monitored application 126 into a reduced-power mode (e.g., slow-refresh mode, no-refresh mode, offline mode, or the like).

If it is determined that device 110 is travelling at high velocity (e.g., more than 20 miles per hour, or other suitable threshold value), then the monitoring module 127 may command the monitored application to reduce its GPS polling interval, and/or to reduce its server update interval (e.g., for data), in order to further reduce power consumption.

In some embodiments, monitoring module 127 may suggest to the user, and may allow the user if he confirms, to activate Cell-ID based navigation instead of GPS based navigation, for example, in order to reduce power consumption and/or once the power level of the power source is below a pre-defined (or configurable) threshold value (e.g., below 20 percent of full capacity).

In some embodiments, the monitoring module 127 may optionally monitor SMS messages (e.g., by listening to one or more pre-designated ports), in order to allow external activation and/or external deactivation of the monitored application 126.

In some embodiments, the monitoring module 127 may record and log the activation time and termination time of the monitored application 126, in order to identify usage patterns which may be utilized in the activation/deactivation algorithm used by the monitoring module 127. For example, the monitoring module 127 may detect that device 110 is in high-velocity motion, and/or that the monitored application 126 is fully activated and used, on particular days and times (e.g., on weekdays between 08:00 to 08:45, corresponding to the user driving from home to work; on weekdays between 17:00 to 17:50, corresponding to the user driving from work to home; on Tuesdays between 20:30 to 20:45, corresponding to the user driving to a weekly tennis session; or the like). The identified usage patterns may be taken into account by the monitoring module 127, for example, for determining whether or not the monitored application 126 may be shut-down or switched to reduced-power mode or fully activated. For example, if the monitoring module 127 detects a usage pattern on weekdays between 08:00 to 08:45, the monitoring module 127 may refrain from shutting-down the monitored application 126 during such time-slots, or may activate or turn on the monitored application 126 (e.g., using an auto-start module 129 as described herein) in these time-slots (e.g., weekdays between 08:00 to 08:45), corresponding to travel time that the user may optionally enter during a setup phase.

In some embodiments, the monitoring module 127 may optionally be implemented by including an auto-start module 129, which may perform auto-start of the monitored application 126 if one or more conditions are met or if one or more determinations are made. For example, if the monitored application 126 is shut-down, but may be restarted due to sufficient power level and/or due to high-velocity movement, then the auto-start module 129 may launch the monitored application 126. In contrast, if it is determined that the user of device 110 is "roaming", the auto-start module 129 may avoid further processing operations and may avoid attempts to launch the monitored application 129; however, the user may override this by manually launching the monitored application 129.

In some embodiments, the auto-start module 129 may automatically activate the monitored application 126, and the monitoring module 127 may automatically turn-on or turn-off a feature of function of the monitored application 126 (or may turn-on or turn-off the monitored application 126), based on one or more monitored conditions or parameters, for example, time of day, time-based or date-based parameters, day of week, movement or non-movement, roaming or non-roaming (e.g., shut-down of a wireless data connection when the user is roaming, due to economical considerations), parameters which may be manually set-up by the user (e.g., the user may define that the monitored application 126, or one or more features thereof, be activated or be shut-down if one or more conditions are met), or the like. Other suitable conditions may be used.

Figure 2:
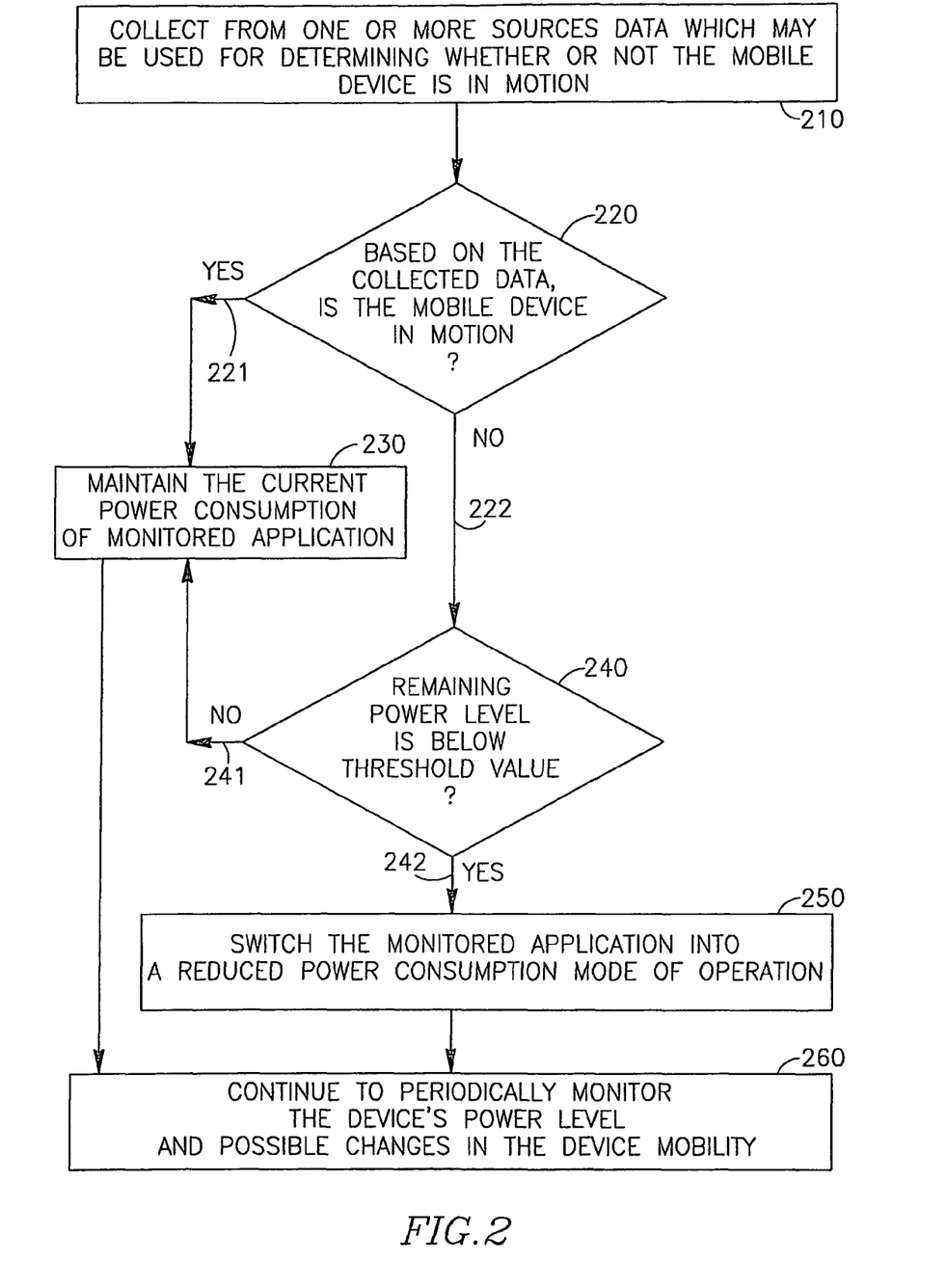
FIG. 2 is a schematic flow-chart of a method of power saving for mobile devices, in accordance with some demonstrative embodiments.

FIG. 2 is schematic flow-chart of a method of power saving for mobile devices, in accordance with some demonstrative embodiments. Operations of the method may be used, for example, by system 100 of FIG. 1, by device 110 of FIG. 1, by monitoring module 127 of FIG. 1, and/or by other suitable units, devices and/or systems.

In some embodiments, the method may include, for example, collecting from one or more sources data which may be used for determining whether or not the mobile device is in motion (block 210).

In some embodiments, the method may include, for example, determining or checking, based on the collected data, whether or not the device is in motion (block 220).

If it is determined that the device is in motion (arrow 221), then the method may include, for example, maintaining the current power consumption of a monitored application (block 230); and proceeding to the operations of block 260 (arrow 225).

In contrast, if it is determined that the device is not in motion (arrow 222) (or, that the device is in relatively slow motion), then the method may proceed with the operations of block 240 and onward. For example the method may include checking whether or not the remaining power level of the device is below a threshold value (block 240). If the remaining power level is not below a threshold value (arrow 241), then the method may include, for example, maintaining the current power consumption of the monitored application (block 230). In contrast, if the remaining power level is below the threshold value (arrow 242), then the method may include, for example, switching the monitored application into a reduced power consumption mode of operation (block 250); and continuing to periodically monitor the device's power level and possible changes in the device mobility (block 260).

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution.

Although portions of the discussion herein may relate, for demonstrative purposes, to activation and/or shut-down of a monitored application (of of feature(s) thereof) based on motion and/or velocity and/or power level, other suitable parameters and/or conditions may be used, for example, location of the roaming or non-roaming, location, GPS data, information or conditions pre-defined by the user of the mobile device, identified patterns of usage of the mobile device and/or of the monitored application, or the like.

Discussions herein utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, infraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A method comprising:
   based on one or more collected information items, determining whether or not a condition related to a mobile device is true; and
   controlling a monitored application of the mobile device in response to the determination and according to usage patterns of the monitored application to perform at least one of:
   activating the monitored application;
   shutting down the monitored application;
   activating a feature of the monitored application;
   deactivating a feature of the monitored application; and
   switching the monitored application from a first mode of operation to a second, different, mode of operation.

2. The method of claim 1, wherein the one or more information items comprise at least one of:
   Cell ID information;
   connectivity information to a wireless communication network;
   roaming information;
   time-related information;
   date-related information;
   accelerometer information; and
   Global Positioning System (GPS) data.

3. The method of claim 1, wherein the switching comprises:
switching a Global Positioning System (GPS) receiver of the mobile device into a mode selected from the group consisting of: operational mode, standby mode, and shut-down mode.

4. The method of claim 1, further comprising:
determining whether or not the mobile device is in rapid motion; and
if the mobile device is not in rapid motion, turning off a navigation application of the mobile device.

5. The method of claim 1, further comprising:
if the mobile device is roaming, disconnecting a wireless data link of the mobile device.

6. The method of claim 1, further comprising:
determining whether or not the mobile device is in rapid motion; and
if the mobile device is in rapid motion, activating the monitored application.

7. The method of claim 6, wherein determining whether or not the mobile device is in rapid motion comprises:
comparing among two or more consecutive measures of data items indicating location of the mobile device.

8. The method of claim 1, further comprising:
determining whether or not the mobile device is in rapid motion; and
if the mobile device is not in rapid motion, and if a remaining power level of the mobile device is below a threshold value, switching the monitored application into a reduced-power mode of operation.

9. The method of claim 1, further comprising:
based on a plurality of Global Positioning System (GPS) readings, determining that the mobile device is not in motion;
presenting a notification that the monitored application is to be automatically shut-down unless a user of the mobile device selects to avoid shut-down of the monitored application; and
if the user of the mobile device does not select, within a pre-defined time period, to avoid shut-down of the monitored application, then shutting down the monitored application.

10. The method of claim 1, wherein the mobile device comprises a device selected from the group consisting of:
a cellular phone, a Personal Digital Assistant (PDA) device, a smart-phone, a Portable Navigation Device (PND), a mobile route guidance device, a mobile mapping device, a mobile traffic updates device, a portable audio player, a portable video player, and a portable audio/video player.

11. The method of claim 1, wherein the monitored application comprises a Location-Based Service (LBS) application.

12. The method of claim 1, wherein the monitored application comprises an application selected from the group consisting of:
a route-guidance application;
a dynamic route-guidance application;
a navigation application;
a mapping application;
a traffic updates application;
an application having a relatively high power consumption;
a processing-intensive application;
an application having a relatively high consumption of resources of the mobile device;
an application which automatically refreshes data using a remote server; and
an application which periodically refreshes data using a remote server.

13. A mobile device comprising:
a monitoring module to determine, based on one or more collected information items, whether or not a condition related to the mobile device is true, and, to control a monitored application of the mobile device in response to the determination and according to usage patterns of the monitored application to perform at least one of:
activating the monitored application;
shutting down the monitored application;
activating a feature of the monitored application;
deactivating a feature of the monitored application; and
switching the monitored application from a first mode of operation to a second, different, mode of operation.

14. The mobile device of claim 13, wherein the one or more information items comprise at least one of:
Cell ID information;
connectivity information to a wireless communication network;
roaming information;
time-related information;
date-related information;
accelerometer information; and
Global Positioning System (GPS) data.

15. The mobile device of claim 13, wherein the monitoring module is to switch a Global Positioning System (GPS) receiver of the mobile device into a mode selected from the group consisting of: operational mode, standby mode, and shut-down mode.

16. The mobile device of claim 13, wherein the monitoring module is to determine whether or not the mobile device is in rapid motion;, and if the mobile device is not in rapid motion, the monitoring module is to turn off a navigation application of the mobile device.

17. The mobile device of claim 13, wherein if the mobile device is roaming, the monitoring module is to disconnect a wireless data link of the mobile device.

18. The mobile device of claim 13, wherein the monitoring module is to determine whether or not the mobile device is in rapid motion; and if the mobile device is in rapid motion, to activate the monitored application.

19. The mobile device of claim 18, wherein the monitoring module is to determine whether or not the mobile device is in rapid motion by comparing among two or more consecutive measures of data items indicating location of the mobile device.

20. The mobile device of claim 13, wherein the monitoring module is to determine whether or not the mobile device is in rapid motion; and wherein if the mobile device is not in rapid motion, and if a remaining power level of the mobile device is below a threshold value, then the monitoring module is to switch the monitored application into a reduced-power mode of operation.

21. The mobile device of claim 13, wherein the monitoring module is to determine, based on a plurality of Global Positioning System (GPS) readings, that the mobile device is not in motion; to present a notification that the monitored application is to be automatically shut-down unless a user of the mobile device selects to avoid shut-down of the monitored application; and if the user of the mobile device does not select, within a pre-defined time period, to avoid shut-down of the monitored application, to shut-down the monitored application.

22. The mobile device of claim 13, wherein the mobile device comprises a device selected from the group consisting of:
- a cellular phone, a Personal Digital Assistant (PDA) device, a smart-phone, a Portable Navigation Device (PND), a mobile route guidance device, a mobile mapping device, a mobile traffic updates device, a portable audio player, a portable video player, and a portable audio/video player.

23. The mobile device of claim 13, wherein the monitored application comprises a Location-Based Service (LBS) application.

24. The mobile device of claim 13, wherein the monitored application comprises an application selected from the group consisting of:
- a route-guidance application;
- a dynamic route-guidance application;
- a navigation application;
- a mapping application;
- a traffic updates application;
- an application having a relatively high power consumption;
- a processing-intensive application;
- an application having a relatively high consumption of resources of the mobile device;
- an application which automatically refreshes data using a remote server; and
- an application which periodically refreshes data using a remote server.

* * * * *

UNITED STATES PATENT AND TRADEMARK OFFICE
CERTIFICATE OF CORRECTION

PATENT NO. : 8,271,057 B2
APPLICATION NO. : 12/382411
DATED : September 18, 2012
INVENTOR(S) : Levine et al.

It is certified that error appears in the above-identified patent and that said Letters Patent is hereby corrected as shown below:

IN THE SPECIFICATION

At column 8, line 26-27, please replace "applications" with -- application -- so that the corresponding phrase reads -- an application that heavily utilizes --.

At column 8, line 34, please replace "applications" with -- application -- so that the corresponding phrase reads -- an application utilizing --.

IN THE CLAIMS

At column 16, line 36, Claim 16, please replace "motion;," with -- motion, -- so that the corresponding phrase reads -- rapid motion, and if the mobile device --.

Signed and Sealed this
Thirtieth Day of April, 2013

Teresa Stanek Rea
*Acting Director of the United States Patent and Trademark Office*